Sept. 5, 1967 C. R. CORPEW 3,340,418

PHASE REVERSING CONTROL CIRCUIT FOR NULLIFYING THE EFFECT OF A.C. TRANSIENTS IN A CATHODE-RAY TUBE

Filed Oct. 17, 1963

INVENTOR.
CHARLES R. CORPEW
BY
Robert L. Nathans
ATTORNEY

United States Patent Office 3,340,418
Patented Sept. 5, 1967

3,340,418
PHASE REVERSING CONTROL CIRCUIT FOR NULLIFYING THE EFFECT OF A.C. TRANSIENTS IN A CATHODE-RAY TUBE

Charles R. Corpew, San Diego, Calif., assignor, by mesne assignments, to Stromberg-Carlson Corporation, Rochester, N.Y., a corporation of Delaware Filed Oct. 17, 1963, Ser. No. 316,897
8 Claims. (Cl. 315—9)

ABSTRACT OF THE DISCLOSURE

A circuit effecting accurate beam positioning in a cathode-ray tube by an electromagnetic yoke in the form of a second cathode-ray tube having a yoke connected to the yoke of the other cathode-ray tube so that the transient A.C. component produced therein by abrupt change in beam positioning current is reproduced in said second yoke thereby deflecting the beam in said second cathode-ray tube in correspondence therewith, and means for reproducing the A.C. transient signal from the light image produced by the second tube and for inverting said signal for application to a second beam positioner in the other cathode-ray tube.

The present invention relates to cathode-ray tube beam positioning circuitry.

Readout equipment for data processors may utilize shaped beam cathode-ray tubes. These tubes include a beam forming matrix which shapes the beam to form indicia prior to its striking the face of the tube at a particular point which is controlled by passing different D.C. currents through X and Y direction electromagnetic yokes. Such readout equipment is disclosed in U.S. Patent 2,924,742, assigned to the same assignee as the present invention.

In order to facilitate rapid information readout, it is important that the beam be shifted from one position to another in the shortest possible time. However, the electromagnetic yokes besides having inductive reactance also exhibit capacitive reactance and, accordingly, abrupt current changes cause random oscillations or A.C. transients to be generated within the yoke. As a result, the settling time of the beam upon being shifted from one position to another is considerably greater than it would be in the absence of these transients.

Accordingly, it is the principal object of the present invention to provide cathode-ray tube beam positioning circuitry which causes a randomly deflected beam to settle in an extremely short time period, thereby to greatly increase the rate at which information may be read out of a data processing system.

Further objects and advantages of the invention will become apparent as the following description proceeds and the features of novelty which characterize the invention will be pointed out with particularity in the claims annexed to and forming a part of this specification.

Figure 1:
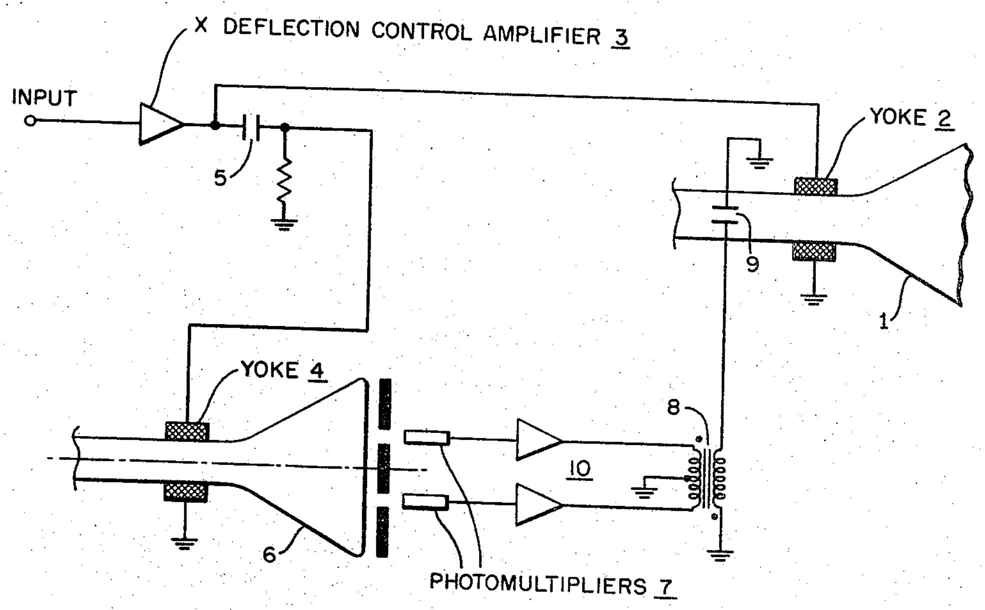

For a better understanding of the invention, reference may be had to the accompanying drawing, in which:

FIG. 1 discloses a preferred embodiment of the present invention; and

Figure 2:
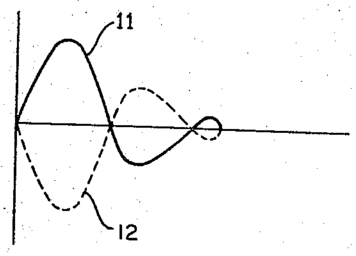

FIG. 2 discloses a pulse diagram which will be helpful in the understanding of the operation of the embodiment of FIG. 1.

In accordance with the present invention, the transient A.C. component produced by an abrupt change in the D.C. beam positioning control current within the readout tube yoke passes through an electromagnetic yoke of a second cathode-ray tube and is utilized to introduce a similar but phase-reversed signal back into the deflection system of the readout tube to nullify the effect of the original transient A.C. component on the beam. As a result, a randomly deflected beam is made to settle in a fraction of the normally required time so as to greatly increase the rate of information readout from a data processing system. The original A.C. transient component controls the beam of a second cathode-ray tube having an electromagnetic yoke which possesses the same electrical characteristics (including hysteresis characteristics) as the yoke associated with the readout cathode-ray tube. A pair of photomultiplier transducers translate the beam swings within the second cathode-ray tube caused by the original A.C. transient signal into a similar but phase-reversed signal which is reapplied to the readout cathode-ray tube so as to nullify the effect of the original A.C. transient signal on the beam within the readout cathode-ray tube.

The circuitry of FIG. 1 is utilized to control the beam position of the display cathode-ray tube 1 in the X direction. A similar circuit would be utilized to control the beam position in the Y direction. The D.C. control current is applied to yoke 2 by means of X deflection control amplifier 3. As mentioned hereinbefore, this current will be utilized to change the magnetic field within display tube 1 so as to shift the beam position. The A.C. transient signal set up by yoke 2 upon an abrupt change in the D.C. current is applied via capacitor 5 to yoke 4 of cathode-ray tube 6. Yoke 4 will have the same characteristics as yoke 2 so that the electrical and hysteresis effects on the beam within tube 6 will be identical to the effects upon the beam within tube 1. This is an important aspect of the present invention since exact compensation may be thusly attained. The A.C. transient signal applied to yoke 4 will cause the beam within tube 6 to oscillate in step with the signal. Where the current through yoke 4 is zero, equal voltages are generated by photomultipliers 7 and, accordingly, the next flux set up within transformer 8 will be zero and no output voltage will be supplied by the transformer to the electrostatic "small angle" deflection plates 9. Since amplifiers 10 are connected to the upper and lower terminals of the center tapped transformer winding, as shown, the readout circuit associated with tube 6 will operate in push-pull. As the current through yoke 4 causes the beam to be raised, the voltage produced by the upper photomultiplier will be increased and the voltage produced by the lower photomultiplier will be decreased, so that a voltage is applied to deflection plates 9 which is proportional to the current through yoke 4 but is phase-reversed therefrom. Of course, lowering the beam position will cause an opposite voltage to be produced in the output winding of transformer 8 owing to the push-pull relationship of the readout circuit. The phase reversal may be obtained by providing a transformer having windings which are oppositely wound with respect to each other. Of course, phase reversal could be obtained merely by changing the connections between the output transformer winding and plates 9.

Let it be assumed that an A.C. transient signal, such as 11, is generated within yoke 2 upon an abrupt change of control current therethrough. This signal will cause the beam within tube 6 to oscillate in step with the signal. As a result of the operation of the aforementioned readout circuitry associated with tube 6, a signal, such as 12 shown in FIG. 2, will be applied to "small angle" deflection plates 9. Since the A.C. transient signal 11 tends to alter the beam position in a particular manner depending on its wave shape, the wave 12 applied to the deflection plates 9 will cause the beam to behave in an opposite manner so as to cancel the effect of the A.C. transient signal on the beam within readout tube 1. This action will cause the beam to settle in an extremely short time period, as mentioned hereinabove.

It is also possible to nullify the effect of the original A.C. transient signal by coupling the output winding of transformer 8 directly in circuit with yoke 2 rather than applying the output voltage produced by the output winding of transformer 8 to a separate control yoke or set of electrostatic plates.

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. A cathode-ray tube having a beam positioning electromagnetic yoke, first means for passing a D.C. beam positioning current through said yoke including, means for changing said D.C. current from one steady state value to another so as to change the beam position, A.C. transient signal beam compensating means associated with said cathode-ray tube for substantially nullifying the effect upon said beam of the A.C. transient signal produced by said yoke upon changing said D.C. current, means responsive to said first means for generating an A.C. compensation signal having substantially the same wave shape as said A.C. transient signal but phase-reversed therefrom, said A.C. compensation signal being applied to said beam compensating means in control thereof.

2. A cathode-ray tube having a first beam positioning electromagnetic yoke, control means for selectively applying D.C. beam positioning currents at different steady state values to said yoke with rapid switching between values causing generation of A.C. transient signals in said yoke, additional beam positioning means for positioning the beam independently of said yoke, an additional electromagnetic yoke connected to said control means and generating an A.C. transient signal substantially identical to the A.C. transient signal generated in said first yoke in response to switching of said beam positioning current by said control means, detecting means for detecting and inverting the A.C. transient signal in said additional yoke, said inverted A.C. transient signal being applied to said additional beam positioning means in control thereof.

3. The combination defined in claim 2 wherein said additional beam positioning means is an electrostatic beam deflecting system.

4. The combination defined in claim 2 further including means connected between said control means and said additional yoke for restricting the current through said yoke to values representative of the change in level of said beam positioning current.

5. The combination defined in claim 2 wherein said detecting means includes an additional cathode-ray tube having said addition yoke mounted thereon for controlling the position of a beam generated thereby in accordance with said A.C. transient signal, and photo-detector means for transforming a light image generated by the latter beam to said A.C. transient signal.

6. The combination defined in claim 5 wherein said detecting means further includes a transformer connected between said photodetector means and said additional beam positioning means for inverting said A.C. transient signal.

7. A first cathode-ray tube having a first beam positioning electromagnetic yoke, means for passing a D.C. beam positioning current through said first yoke, means for changing said D.C. current from one steady state value to another so as to change the beam position within said first cathode-ray tube, a second cathode-ray tube having a second beam positioning electromagnetic yoke having the same electrical characteristics as said first yoke, means coupled to said first yoke for applying the A.C. transient signal produced by said first yoke upon changing the D.C. current therethrough to said second yoke so that the beam within said second cathode-ray tube oscillates in step with said A.C. transient signal, A.C. transient beam compensating means associated with said first cathode-ray tube for substantially nullifying the effect upon the beam within said first cathode-ray tube of the A.C. transient signal produced by said first yoke upon changing said D.C. current, and means associated with said second cathode-ray tube for analyzing the aforementioned beam oscillations within said second cathode-ray tube and for controlling said beam compensating means with an A.C. compensation signal derived from said oscillations having substantially the same wave shape as said A.C. transient signal but phase-reversed therefrom.

8. The combination as set forth in claim 7 wherein said last-named means includes a pair of photo-pickup transducers arranged in a push-pull relationship to produce said A.C. compensation signal.

References Cited

UNITED STATES PATENTS

| | | | |
|---|---|---|---|
| 2,457,911 | 1/1949 | Munster | 315—9 |
| 2,557,691 | 6/1951 | Rieber | 315—9 |
| 2,567,824 | 9/1951 | Nylund | 333—15 |
| 2,648,772 | 8/1953 | Dawson et al. | 331—86 |

HERMAN KARL SAALBACH, *Primary Examiner.*

ELI LIEBERMAN, *Examiner.*

P. L. GENSLER, *Assistant Examiner.*